June 26, 1956    W. P. GALLAGHER ET AL    2,752,592
COMBINED ELECTRIC MOTOR AND BUZZER CONSTRUCTION
Filed April 6, 1954            2 Sheets—Sheet 1
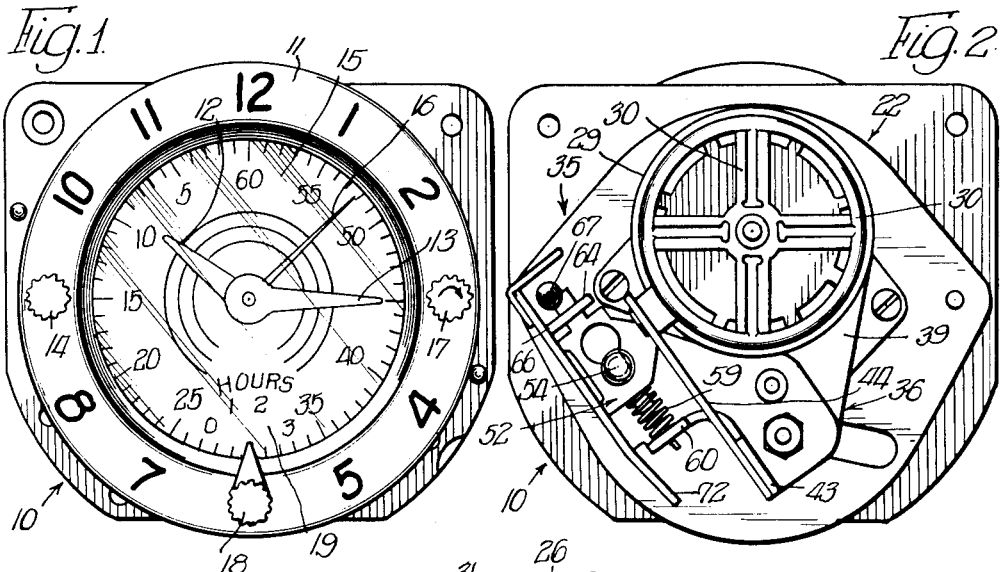
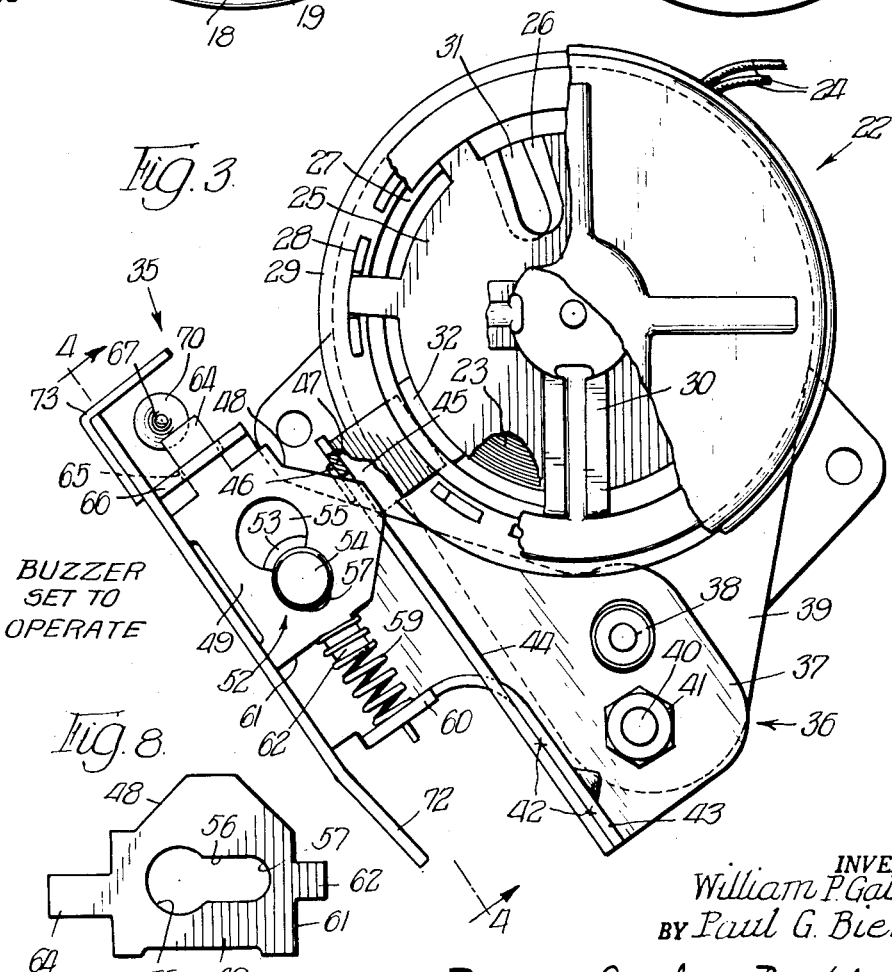
INVENTORS.
William P. Gallagher,
BY Paul G. Bielik,
Brown, Jackson, Boettcher + Dienner
ATTYS.

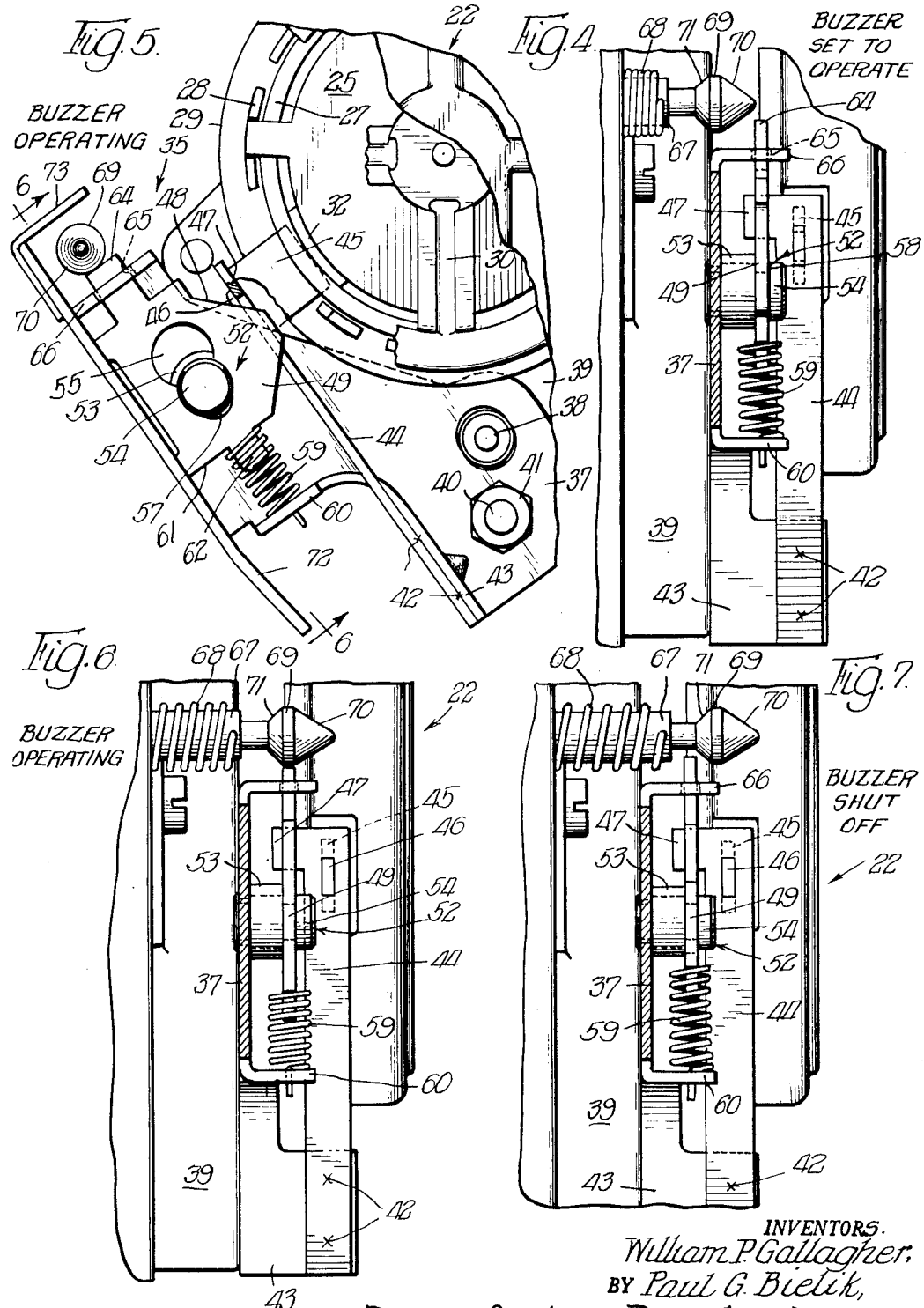

United States Patent Office 2,752,592
Patented June 26, 1956

2,752,592

COMBINED ELECTRIC MOTOR AND BUZZER CONSTRUCTION

William P. Gallagher, River Forest, and Paul G. Bielik, North Riverside, Ill., assignors to International Register Company, Chicago, Ill., a corporation of Illinois Application April 6, 1954, Serial No. 421,396

10 Claims. (Cl. 340—393)

This invention relates, generally, to buzzer mechanisms and it has particular relation to these mechanisms for use in conjunction with interval timers, such as shown in Gallagher et al. Patent No. 2,568,122, issued September 18, 1951, the interval timer being driven by a motor of the type shown in Gallagher application Serial No. 132,959, filed December 14, 1949, and assigned to the assignee of this application, now Patent No. 2,681,444, issued June 15, 1954.

Among the objects of this invention are: To provide simple, efficient and economical means for controlling the operation of a buzzer arranged to be set in operation upon the expiration of a predetermined time interval under the control of an alternating current electromagnetic field generated by the stator of a small synchronous motor used to drive an interval timing mechanism; to prevent operation of the buzzer independently of the means employed to set the same for operation and for shutting it off; to employ manually operable signal control means having set and off positions and an intermediate on position for applying a control force to the buzzer only in the on position; and to prevent operation of the buzzer by a relatively powerful spring which reacts on the movable part of the buzzer to hold the same stationary and in a position of minimum reluctance.

Other objects of this invention will, in part, be obvious and in part appear hereinafter.

This invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of this invention reference can be had to the following detailed description, taken together with the accompanying drawings, in which:

Figure 1 is a view, in front elevation, of an interval timer in which the present invention is embodied;

Figure 2 is a view, in rear elevation, of the interval timer shown in Figure 1, the cover for the small synchronous motor having been removed;

Figure 3 is a view, at an enlarged scale, of the motor and buzzer mechanism employed in the interval timer shown in the preceding figures, certain parts being broken away and others being shown in section in order to illustrate more clearly the details of construction;

Figure 4 is a view, taken generally along the line 4—4 of Figure 3 and shows the buzzer set to operate;

Figure 5 is a view, similar to Figure 3, but showing the relationship of the parts when the buzzer is operating;

Figure 6 is a sectional view taken generally along the line 6—6 of Figure 5 and, as described, showing the relationship of the parts when the buzzer is operating;

Figure 7 is a view, similar to Figures 4 and 6, but showing the relationship of the parts when the buzzer is shut off; and Figure 8 is a view showing the shutoff cam by itself.

Referring now particularly to Figure 1 of the drawings it will be observed that the reference character 10 designates, generally, an interval timer of the general type shown in the Gallagher et al. patent. The interval timer 10 may be provided with a dial 11 which is calibrated in hours from one to twelve. Cooperating with the dial 11 are an hour hand 12 and a minute hand 13 which are arranged to be driven by a small synchronous motor that is described in more detail hereinafter. A time setting knob 14 is arranged to set the hands 12 and 13 to the correct time. Within the annular dial 11 is another dial 15 which is calibrated in minutes from zero to sixty. A pointer 16 cooperates with the dial 15 and its position is arranged to be set by a signal control knob 17. The pointer 16 can be set, as described in the Gallagher et al. patent, to a position corresponding to any part of an hour which it is desired to measure. In order to extend the interval beyond one hour means are provided as described in the Gallagher et al. patent. These means include hour setting knob 18 which cooperates with a scale 19 that is calibrated from zero to three. It is possible to obtain the measurement of an interval up to four hours in hours and minutes by setting the knob 18 to the desired number of hours and the pointer 16 to the desired number of minutes. At the end of the interval a signal is given by means of a buzzer mechanism the construction of which is disclosed hereinafter and embodies the present invention.

As shown in Figure 2 a synchronous motor, indicated generally at 22, is mounted on the rear of the interval timer 10. The synchronous motor 22 preferably is constructed as disclosed in the Gallagher application above referred to. It includes a field winding 23, Figure 3, that can be connected by conductors 24 to a suitable source of alternating current such as a 125 volt 60 cycle source. The field winding 23 is surrounded by a magnetic circuit which includes outer and inner field plates 25 and 26 which have a shading ring 27 of copper cooperating therewith. Surrounding the field plates 25 and 26 is a field ring 28 which has a shading ring 29 cooperating therewith. It will be understood that the shading rings 27 and 29 in conjunction with polar projections from the field plates 25 and 26 and the field ring 28 cooperate to provide a shifting magnetic field for effecting the rotation of a rotor 30 to operate at a synchronous speed. It will be understood that the rotor 30 through suitable gear reduction mechanism drives the interval timer 10 to operate the hands 12 and 13 for the purpose of indicating the time of day and also, when the signal control knob 17 is withdrawn to cause the interval timer 10 to measure out the set interval at the end of which the buzzer is operated as will be described presently. Associated with the outer and inner field plates 25 and 26 is a buzzer plate 31 from which a pole piece 32 projects inwardly as shown more clearly in Figures 3 and 5 of the drawings.

The buzzer mechanism of the present invention is indicated, generally, at 35 in Figures 2, 3 and 5 of the drawings. It includes a bracket 36 that may be formed of cold rolled steel and is shaped to provide certain support and guide means which will now be described. The bracket 36 includes a flat portion 37 through which a bearing sleeve 38 projects from a gear case 39. The bearing sleeve 38 serves, in part, to locate the bracket 36 in the desired position on the gear case 39. A stud 40 extends outwardly from the gear case 39 and through the flat portion 37. A nut 41 threaded on the stud 40 serves to clamp the bracket 36 in the desired position on the gear case 39.

Spot welded at 42 to an upturned ear 43 from the bracket 36 is a resilient buzzer arm 44 that may be formed of cold rolled steel. The other end of the buzzer arm 44 overlies the pole piece 32 and at this other end a hammer 45 of magnetic material, such as steel, is riveted at 46. It will be understood that the hammer 45 projects through a space provided by omitting certain of the pole tips from the magnetic circuit surrounding the field winding 23 and that it is arranged to cooperate with the pole piece 32 to function as a buzzer when the field winding 23 is energized with alternating current. The combination of the alternating current electromagnetic field and the resiliency of the buzzer arm 44 serve to move the hammer 45 rapidly into and out of contact with the pole piece 32 or into and out of a position of minimum reluctance with respect thereto to give the desired signal. It will be understood that the magnetic circuit is completed from the hammer 45 through the buzzer arm 44 of magnetic material, the bracket 36, also of magnetic material and the gear case 39 of magnetic material.

It is desirable to control the operation of the hammer 45 in such manner that no force is required to be exerted by any part of the interval timer 10 except when the buzzer mechanism 35 actually is operating. For this purpose the resilient buzzer arm 44 has an inwardly extending projection 47 at the end where the hammer 45 is located. This projection 47 is arranged to be engaged by an inclined cam surface 48 of a shutoff cam 49 which is shown in Figures 3, 5 and 8 of the drawings. The shutoff cam 49 can be formed of flat steel plate and is arranged to be slidably mounted on the bracket 36 so that it moves generally parallel to the resilient buzzer arm 44.

The shutoff cam 49 is guided for translatory movement on the bracket 36, in part, by a stud 52 which is riveted to the flat portion 37 of the bracket 36 and has a large diameter portion 53 on which the underside of the shutoff cam 49 rides. The stud 52 has a small diameter head 54 which can be inserted through a large diameter opening 55 in the shutoff cam 49 to permit assembly. As shown in Figure 8 the shutoff cam 49 has a slot 56 which terminates in a semi-circular opening 57. It will be understood that the stud 52 projects through the slot 56 in the assembled position of the shutoff cam 49 for guiding it. The stud 52 has an under cut portion 58 for receiving the portions of the shutoff cam 49 along the slot 56.

In order to hold the hammer 45 in engagement with the pole piece 32 or in a position of minimum reluctance with respect thereto and against the biasing force of the resilient buzzer arm 44 which tends to move the hammer 45 away from the pole piece 32, a relatively powerful coil compression spring 59 is employed. As shown in the drawings, the coil compression spring 59 is strained between a tab 60 which is turned up from the bracket 36, and one end 61 of shutoff cam 49. A tongue 62 formed integrally with the shutoff cam 49 projects into the spring 59 for centering it.

The other end of the shutoff cam 49 is guided by a tongue 64, formed integrally therewith, which projects through a slot 65 in a tab 66 that is turned upwardly from the flat portion 37 of the bracket 36. It will be understood that the coil spring 59, reacting against the end 61 of the shutoff cam 49, acts to hold the hammer 45 in the off position. This is accomplished by the engagement of the inclined cam surface 48 of the shutoff cam 49 with the projection 47 that extends laterally from the resilient buzzer arm 44.

In order to set the buzzer mechanism 35 and to shut it off a signal control shaft 67 is employed. The signal control shaft 67 is operated by the signal control knob 17 and is arranged to be moved endwise through the housing of the interval timer 10. The signal control shaft 67 has three positions. When the signal control knob 17 is withdrawn from the interval timer 10 to the extent permitted, the buzzer mechanism is set to operate. At the expiration of the interval for which the timer is set, the signal control shaft 67 is released and is moved inwardly by a coil compression spring 68 to an on position. The signal control shaft 67 is released for movement under the influence of the biasing spring 68 by the interval timer 10 as described in the Gallagher et al. patent previously referred to (see col. 6, ls. 1–75, col. 7, ls. 1–22). In this position a head portion 69 provided at the inner end of the signal control shaft 67, engages the outer end of the tongue 64, as shown in Figure 6 of the drawings. The movement of the signal control shaft 67 from the set position, shown in Figure 4, is facilitated by an inclined portion 70 which leads from the inner end of the signal control shaft 67 to the large diameter head portion 69. A similar inclined portion 71 leads from the opposite side of the head portion 69 thereto.

When the head portion 69 engages the outer end of the tongue 64, as shown in Figures 5 and 6 of the drawings, the shutoff cam 49 is moved against the biasing force of the coil compression spring 59 to a position where the inclined cam surface 48 is out of engagement with the projection 47. The buzzer arm 44 and hammer 45 then are free to vibrate under the driving force provided by the alternating current electromagnetic field in a manner previously described.

In order to shutoff the buzzer mechanism 35, the signal control knob 17 is depressed. This moves the signal control shaft 67 further inwardly to the position as shown in Figure 7 where the large diameter head portion 69 no longer registers with the tongue 64. In this position the coil compression spring 68 restores the shutoff cam 49 to the non-operating position where the inclined cam surface 48 engages the projection 47, thereby preventing further movement of the hammer 45 and resilient buzzer arm 44.

With a view to protecting the buzzer mechanism 35, a flange 72, formed integrally with the bracket 36 is turned upwardly to overlie the shutoff cam 49 and the coil compression spring 59. The flange 72 also extends over the signal control shaft 67 and a guard 73, welded to this portion of the flange 72, protects this shaft against interference by wiring or the like which might bear against the signal control shaft 67 and interfere with its proper operation.

In operation, assuming that the motor 22 is energized and that the interval timer 10 shows the correct time, the desired interval is set by positioning the hour setting knob 18, as desired, and by withdrawing the signal control knob 17 and turning it in the direction indicated by the arrow to set the pointer 16 at the desired time on the dial 15. When the signal control knob 17 is withdrawn, the signal control shaft 67 is moved from the position shown in Figure 7 to the position shown in Figures 3 and 4 of the drawings. Meanwhile the coil compression spring 59 holds the shutoff cam 49 in such position that the hammer 45 cannot vibrate. At the end of the interval for which the timer 10 is set, the signal control shaft 67 is released, as described in the Gallagher et al. patent, for movement under the influence of the coil compression spring 68. The inclined portion 70 rides over the end of the tongue 64 until the large diameter head portion 69 is reached. This is shown in Figures 5 and 6 of the drawings where the shutoff cam 49 is moved against the biasing force of the coil compression spring 59 and the inclined cam surface 48 is moved out of engagement with the projection 47. The hammer 45 then vibrates under the combined influence of the resiliency of the buzzer arm 44 and the alternating current electromagnetic field. The buzzer action is arrested by depressing the signal control knob 17. This moves the signal control shaft 67 endwise inwardly to the position shown in Figure 7. The coil compression spring 59 restores the shutoff cam 49 to the position shown in Figure 3 where further operation of the hammer 45 is prevented. It will be observed that no side thrust is applied to the signal control shaft 67 except for the very brief intervals when the inclined portions 70 and 71 are in engagement with the end of the tongue 64 and when the large diameter head portion 69 is in engagement therewith. Also it will be observed that the endwise movement of the signal control shaft 67 is generally at right angles to the translatory movement of the shutoff cam 49.

Since certain changes can be made in the foregoing construction and different embodiments of the invention can be made without departing from the spirit and scope thereof, it is intended that the matter shown in the accompanying drawings and described hereinbefore shall be interpreted as illustrative and not in a limiting sense.

What is claimed as new is:

1. A buzzer mechanism comprising, in combination, signal control means manually operable to set and off positions and adapted to be actuated to as on position upon the expiration at a predetermined time interval after being placed in the set position, alternating current electromagnetic means, a hammer of magnetic material adapted to be attracted by said electromagnetic means, means biasing said hammer away from said electromagnetic means, and means actuated by said signal control means in the set and off positions to hold said hammer immovable and in a position of minimum reluctance with respect to said electromagnetic means and to release said hammer to reciprocate toward and away from said electromagnetic means when said signal control means is in the on position.

2. A buzzer mechanism comprising, in combination, signal control means manually operable to set and off positions and adapted to be actuated to an on position upon the expiration of a predetermined time interval after being placed in the set position, alternating current electromagnetic means, a hammer of magnetic material adapted to be attracted by said electromagnetic means, means biasing said hammer away from said electromagnetic means, detent means cooperating with said signal control means and said hammer, and spring means biasing said detent means, said signal control means in the set and off positions permitting said spring means through said detent means to hold said hammer against the force exerted by said biasing means and immovable and in a position of minimum reluctance with respect to said electromagnetic means, said signal control means in the on position holding said detent means against the force exerted by said spring means and out of operative relation with said hammer whereupon the same is free to reciprocate toward and away from said electromagnetic means under the joint control thereof and of said biasing means.

3. A buzzer mechanism comprising, in combination, an endwise slidable signal control shaft manually operable to set and off positions and adapted to be actuated to an intermediate on position upon the expiration of a predetermined time interval after being placed in the set position, alternating current electromagnetic means, a hammer of magnetic material mounted in a position to be attracted toward said electromagnetic means, means biasing said hammer away from said electromagnetic means, and means actuated by said signal control shaft in the set and off positions to hold said hammer immovable and in a position of minimum reluctance with respect to said electromagnetic means and to release said hammer to reciprocate under the joint control of said biasing means and said electromagnetic means toward and away from the latter when said signal control shaft is in the on position.

4. A buzzer mechanism comprising, in combination, an endwise slidable signal control shaft manually operable to set and off positions and adapted to be actuated to an intermediate on position upon the expiration of a predetermined time interval after being placed in the set position, alternating current electromagnetic means, a hammer of magnetic material mounted in a position to be attracted toward said electromagnetic means, means biasing said hammer away from said electromagnetic means, detent means movable in a plane transverse to the longitudinal axis of said signal control shaft and cooperating therewith and with said hammer, spring means biasing said detent means toward said signal control shaft, and means operated by said signal control shaft in the on position for holding said detent means against the force exerted by said spring means and out of operative relation with said hammer whereupon the same is free to reciprocate toward and away from said electromagnetic means under the joint control thereof and of said biasing means, said signal control shaft in the set and off positions permitting said spring means through said detent means to hold said hammer against the force exerted by said biasing means and immovable and in a position of minimum reluctance with respect to said electromagnetic means.

5. A buzzer mechanism comprising, in combination, an endwise slidable signal control shaft having a head portion and being manually operable to set and off positions and adapted to be actuated to an on position between said set and off positions upon the expiration of a predetermined time interval after being placed in the set position, alternating current electromagnetic means including a fixed pole piece, a hammer of magnetic material extending toward said pole piece, resilient means biasing said hammer away from said pole piece when said hammer is free, a movably mounted shutoff cam for operatively engaging said hammer, and a spring urging said cam into operative engagement with said hammer for moving the same to a position of minimum reluctance with respect to said pole piece to prevent operation of said hammer, said shutoff cam having a portion extending into the path of movement of said head portion of said control shaft whereby, when said portion of said shutoff cam is engaged by said head portion in the on position of said signal control shaft, said shutoff cam is held out of operative engagement with said hammer and the same is free to reciprocate toward and away from said pole piece and, when said head portion is out of engagement with said portion of said shutoff cam in either the set or the off position of said signal control shaft, said shutoff cam is held by said spring in operative engagement with said hammer and the same is prevented from reciprocating.

6. A buzzer mechanism comprising, in combination, an endwise slidable signal control shaft having a head portion, said shaft being manually operable to set and off positions and adapted to be actuated to an on position between said set and off positions upon the expiration of a predetermined time interval after being placed in the set position, alternating current electromagnetic means including a fixed pole piece, a resilient buzzer arm stationarily mounted at one end, a hammer of magnetic material carried by the other end of said buzzer arm and extending toward said pole piece and biased by said buzzer arm away therefrom when said buzzer arm is free, a movably mounted shutoff cam having a cam surface for engaging said buzzer arm, and a spring biasing said shutoff cam and urging said cam surface thereof into engagement with said buzzer arm and thereby said hammer to a position of minimum reluctance with respect to said pole piece to prevent operation of said hammer, said shutoff cam having a portion extending into the path of movement of said head portion of said control shaft whereby, when said portion of said shutoff cam is engaged by said head portion in the on position of said signal control shaft, said shutoff cam is held out of engagement with said buzzer arm and the same and said hammer are free to reciprocate toward and away from said pole piece and, when said head portion is out of engagement with said portion of said shutoff cam in either the set or the off position of said signal control shaft, said shutoff cam is held by said spring in engagement with said buzzer arm and the same and said hammer are prevented from reciprocating.

7. A buzzer mechanism comprising, in combination, an endwise slidable signal control shaft having a head portion, said shaft being manually operable to set and off positions and adapted to be actuated to an intermediate on position upon the expiration of a predetermined time interval after being placed in the set position, alternating current electromagnetic means including a fixed pole piece, a stationarily mounted bracket, a resilient buzzer arm secured at one end to said bracket and extending over said pole piece, a hammer of magnetic material carried by the other end of said buzzer arm and extending toward said pole piece and biased by said buzzer arm away therefrom when said buzzer arm is free, a shutoff cam slidably mounted on said bracket and having an inclined cam surface for engaging said buzzer arm, and a coil compression spring strained between said bracket and said shutoff cam and urging said cam surface thereof into engagement with said buzzer arm and thereby said hammer into engagement with said pole piece to prevent operation of said hammer, said shutoff cam having a portion extending into the path of movement of said head portion of said control shaft whereby, when said portion of said shutoff cam is engaged by said head portion in the on position of said signal control shaft, said shutoff cam is held out of engagement with said buzzer arm and the same and said hammer are free to reciprocate toward and away from said pole piece and, when said head portion is out of engagement with said portion of said shutoff cam in either the set or the off position of said signal control shaft, said shutoff cam is held by said spring in engagement with said buzzer arm and the same and said hammer are prevented from reciprocating.

8. A buzzer mechanism comprising, in combination, an endwise slidable signal control shaft having a head portion with oppositely inclined portions leading thereto, said shaft being manually operable to set and off positions and adapted to be actuated to an intermediate on position upon the expiration of a predetermined time interval after being placed in the set position, alternating current electromagnetic means including a fixed pole piece, a stationarily mounted bracket, a resilient buzzer arm secured at one end to said bracket and extending over said pole piece, a projection extending laterally from the other end of said buzzer arm, a hammer of magnetic material carried by said other end of said buzzer arm and extending toward said pole piece and biased by said buzzer arm away therefrom when said buzzer arm is free, a shutoff cam slidably mounted on said bracket and having an inclined cam surface for engaging said projection on said buzzer arm, and a coil compression spring strained between said bracket and said shutoff cam and urging said cam surface thereof into engagement with said projection and thereby said hammer into engagement with said pole piece to prevent operation of said hammer, said shutoff cam having a portion extending into the path of movement of said head portion of said control shaft whereby, when said portion of said shutoff cam is engaged by said head portion in the on position of said signal control shaft, said shutoff cam is held out of engagement with said buzzer arm and the same and said hammer are free to reciprocate toward and away from said pole piece and, when said head portion is out of engagement with said portion of said shutoff cam in either the set or the off position of said signal control shaft, said shutoff cam is held by said spring in engagement with said buzzer arm and the same and said hammer are prevented from reciprocating.

9. A buzzer mechanism comprising, in combination, an endwise slidable signal control shaft having a head portion with oppositely inclined portions leading thereto, said shaft being manually operable to set and off positions and adapted to be actuated to an intermediate on position upon the expiration of a predetermined time interval after being placed in the set position, alternating current electromagnetic means including a fixed pole piece, a stationarily mounted bracket, a resilient buzzer arm secured at one end to said bracket and extending over said pole piece, a projection extending laterally from the other end of said buzzer arm, a hammer of magnetic material carried by said other end of said buzzer arm and extending toward said pole piece and biased by said buzzer arm away therefrom when said buzzer arm is free, a shutoff cam slidably mounted on said bracket and having an inclined cam surface for engaging said projection on said buzzer arm, means on said bracket for guiding said shutoff cam for translatory movement, a coil compression spring strained between said bracket and one end of said shutoff cam and urging said cam surface thereof into engagement with said projection and thereby said hammer into engagement with said pole piece to prevent operation of said hammer, and a tongue extending from the other end of said shutoff cam into the path of movement of said head portion of said control shaft whereby, when said tongue is engaged by said head portion in the on position of said signal control shaft, said shutoff cam is held out of engagement with said projection on said buzzer arm and the same and said hammer are free to reciprocate toward and away from said pole piece and, when said head portion is out of engagement with said tongue on said shutoff cam in either the set or the off position of said signal control shaft, said shutoff cam is held by said spring in engagement with said projection on said buzzer arm and the same and said hammer are prevented from reciprocating.

10. A buzzer mechanism comprising, in combination, an endwise slidable signal control shaft having a head portion with oppositely inclined portions leading thereto, said shaft being manually operable to set and off positions and adapted to be actuated to an intermediate on position upon the expiration of a predetermined time interval after being placed in the set position, alternating current electromagnetic means including a fixed pole piece, a stationarily mounted bracket, a resilient buzzer arm secured at one end to said bracket and extending at right angles to said signal control shaft and over said pole piece, a projection extending laterally from the other end of said buzzer arm, parallel to said control shaft, a hammer of magnetic material carried by said other end of said buzzer arm and extending toward said pole piece and biased by said buzzer arm away therefrom when said buzzer arm is free, a shutoff cam slidably mounted on said bracket for movement at right angles to said signal control shaft and having an inclined cam surface at one end for engaging said projection on said buzzer arm, means on said bracket for guiding said shutoff cam for translatory movement, a coil compression spring strained between said bracket and the other end of said shutoff cam and urging said cam surface thereof into engagement with said projection and thereby said hammer into engagement with said pole piece to prevent operation of said hammer, and a tongue extending from said one end of said shutoff cam into the path of movement of said head portion of said control shaft whereby, when said tongue is engaged by said head portion in the on position of said signal control shaft, said shutoff cam is held out of engagement with said projection on said buzzer arm and the same and said hammer are free to reciprocate toward and away from said pole piece and, when said head portion is out of engagement with said tongue on said shutoff cam in either the set or the off position of said signal control shaft, said shutoff cam is held by said spring in engagement with said projection on said buzzer arm and the same and said hammer are prevented from reciprocating.

References Cited in the file of this patent

UNITED STATES PATENTS 1,989,076    Bates _____ Jan. 29, 1935